(12) United States Patent
Shi et al.

(10) Patent No.: US 10,128,715 B2
(45) Date of Patent: Nov. 13, 2018

(54) ELECTRIC MOTOR WITH RELIABLE WIRE CONNECTION

(71) Applicant: Johnson Electric S.A., Murten (CH)

(72) Inventors: Hai Feng Shi, Shenzhen (CN); Yue Zou, Shenzhen (CN); James Ching Sik Lau, Hong Kong (CN); Yiu Wah Andy Cheung, Hong Kong (CN)

(73) Assignee: JOHNSON ELECTRIC S.A., Murten (CH)

( * ) Notice: Subject to any disclaimer, the term of this patent is extended or adjusted under 35 U.S.C. 154(b) by 311 days.

(21) Appl. No.: 14/674,834

(22) Filed: Mar. 31, 2015

(65) Prior Publication Data

US 2015/0280509 A1  Oct. 1, 2015

(30) Foreign Application Priority Data

Mar. 31, 2014  (CN) .......................... 2014 1 0127039

(51) Int. Cl.
*H02K 3/38* (2006.01)
*H02K 5/14* (2006.01)
*H02K 5/22* (2006.01)
*H01R 11/11* (2006.01)

(52) U.S. Cl.
CPC ................ *H02K 3/38* (2013.01); *H02K 5/14* (2013.01); *H02K 5/148* (2013.01); *H02K 5/225* (2013.01)

(58) Field of Classification Search
CPC ............ H02K 3/38; H02K 5/14; H02K 5/148; H02K 5/225; H02K 13/10; H02K 13/14

USPC .................. 310/71, 219, 238–240, 248, 249; 439/512, 177, 883–885, 888, 889

See application file for complete search history.

(56) References Cited

U.S. PATENT DOCUMENTS

| 4,851,730 | A | * | 7/1989 | Fushiya | ................. H02K 5/148 |
| | | | | | 310/239 |
| 2010/0045136 | A1 | * | 2/2010 | Lau | ........................ H02K 5/148 |
| | | | | | 310/239 |

FOREIGN PATENT DOCUMENTS

JP    2007267490        10/2007
JP    2007267490 A   * 10/2007 ............... H02K 5/22

OTHER PUBLICATIONS

Machine translation of JP 2007267490 A (Oct. 2007).*

* cited by examiner

*Primary Examiner* — Michael Andrews
(74) *Attorney, Agent, or Firm* — Muncy, Geissler, Olds & Lowe, P.C.

(57) ABSTRACT

An electric motor has a stator, a rotor rotatable with respect to the stator, motor windings, a connection plate electrically connected to the motor windings, and a power lead for connecting the motor to a power source. The power lead is connected to the connection plate by an electrical connection and by a separate mechanical connection. The mechanical connection protects the electrical connection from vibration or movement which may otherwise break the electrical connection.

12 Claims, 6 Drawing Sheets

ELECTRIC MOTOR WITH RELIABLE WIRE CONNECTION

CROSS REFERENCE TO RELATED APPLICATIONS

This non-provisional patent application claims priority under 35 U.S.C. § 119(a) from Patent Application No. 201410127039.X filed in The People's Republic of China on Mar. 31, 2014, the entire contents of which are hereby incorporated by reference.

FIELD OF THE INVENTION

This invention relates to an electric motor and in particular, to an arrangement for attaching power leads to an electric motor.

BACKGROUND OF THE INVENTION

Conventionally, electric motors with power leads have the power leads attached by connection point which serves to make both the electrical connection and the mechanical connection. This is particularly the case for small electric motors. However, in applications where such motors are subject to high vibration or repeated moving where there are forces applied to the power leads, the connection is known to be broken either electrically or mechanically, leading to failure of the motor to operate correctly. Such known connections include solder connections, weld connections, crimp connections and terminal connections.

Weld connections are preferred as they are fast and cheap to make with good mechanical strength and electrical properties. However, vibrations can cause the weld connection to break.

Mechanical connections, such as those using wire connectors, give good mechanical connection but the electrical connection is subject to deterioration as the vibrations cause micro-arcing between the connector and the terminal leading to electrical erosion and high resistance joints, affecting the performance of the motor. In extreme cases the electrical connection can be completely lost.

SUMMARY OF THE INVENTION

Thus there is a desire for an improved way of connecting the lead wires to terminals of the motor which can withstand vibrations or frequent movement.

This is achieved in the present invention by using a separate connection to mechanically fix the power lead to the terminal to stabilize the electrical connection.

Accordingly, in one aspect thereof, the present invention provides an electric motor comprising: a stator, a rotor rotatable with respect to the stator, motor windings, a connection plate electrically connected to the motor windings, and a power lead for connecting the motor to a power source, wherein the power lead is connected to the connection plate by an electrical connection and by a separate mechanical connection.

Preferably, the rotor is a wound rotor having a rotor core and a commutator mounted on a shaft, and the motor windings are formed by coils wound about teeth of the rotor core and connected to segments of the commutator, and wherein the connection plate is electrically connected to the windings by brushes making sliding contact with the commutator.

Preferably, the stator has a housing and permanent magnets fixed to the housing.

Preferably, an end cap is fitted to the housing and supports brush gear, including a plurality of the brushes, the connection plate and a brush mounting plate to which the brushes and the connection plate are mounted.

Preferably, each brush is part of a separate brush assembly comprising the brush, a brush cage in which the brush is slidably mounted and a brush spring for urging the brush into contact with the commutator.

Preferably, each brush has a shunt and at least one of the shunts is electrically connected to the connection plate.

Preferably, there are two connection plates, two power leads respectively connected to the connection plates and two groups of brush assemblies with the brushes of each group of brush assemblies being connected to a corresponding connection plate.

Preferably, there are two brush assemblies in each group of brush assemblies and the brushes of each group are arranged alternately about the commutator.

Preferably, the power lead is mechanically connected to the connection plate by a wire connector.

Preferably, the connection plate has an extension in the form of a male spade terminal and the wire connector is resiliently mated with the male spade terminal.

Preferably, the power lead is electrically connected to the connection plate by weld connection.

Preferably, the electrical connection is between the mechanical connection and the adjacent end of the power lead.

In view of the forgoing, the stability of the connections between the power leads and the motor terminals are greatly improved in a simple manner.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
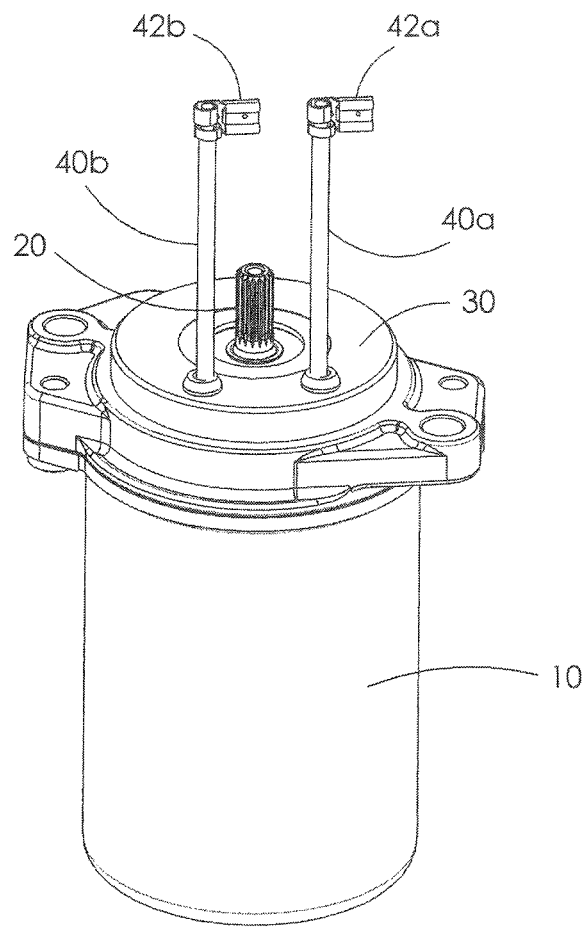
FIG. 1 illustrates an electric motor according to the preferred embodiment of the present invention.

FIG. 1 illustrates an electric motor according to the preferred embodiment. In this embodiment, the motor is a PMDC (permanent magnet, direct current) motor having a permanent magnet stator 10, a wound rotor 20, and an end cap 30. The rotor 20 has a main body or core disposed within the stator 10 and an output shaft extending through the end cap 30. Two power leads 40a, 40b extend through the end cap 30 for connection to a power source (not shown) via connectors 42a, 42b.

Figure 2:
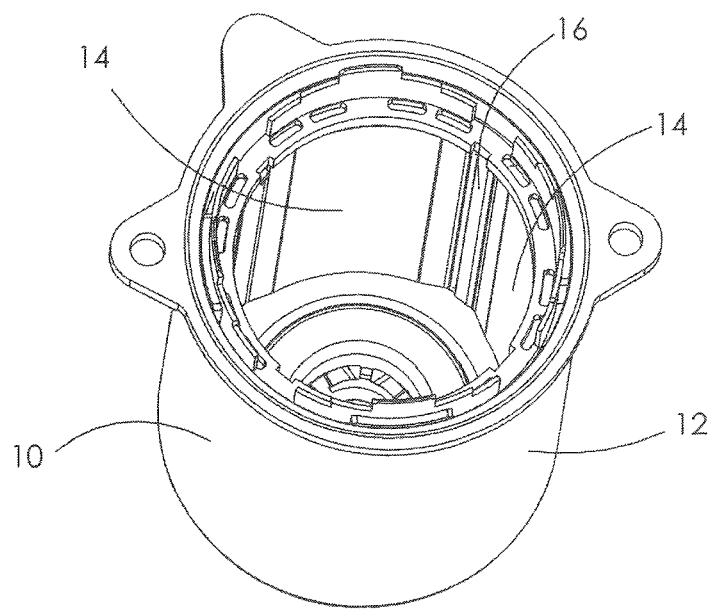
FIG. 2 illustrates a stator of the motor of FIG. 1.

As shown in FIG. 2, the stator has a deep drawn cup like housing having magnets fitted to an inner surface thereof. The stator thus has one closed end and one open end. In the illustrated embodiment, four permanent magnets 14 are uniformly mounted to the inner surface of the housing 12 by a magnet mounting bracket 16. Optionally, steel structures (not shown) may be disposed on inner surfaces of the magnets 14 to help hold the magnets and prevent breakage of the magnets from obstructing rotation of the rotor 20.

Figure 3:
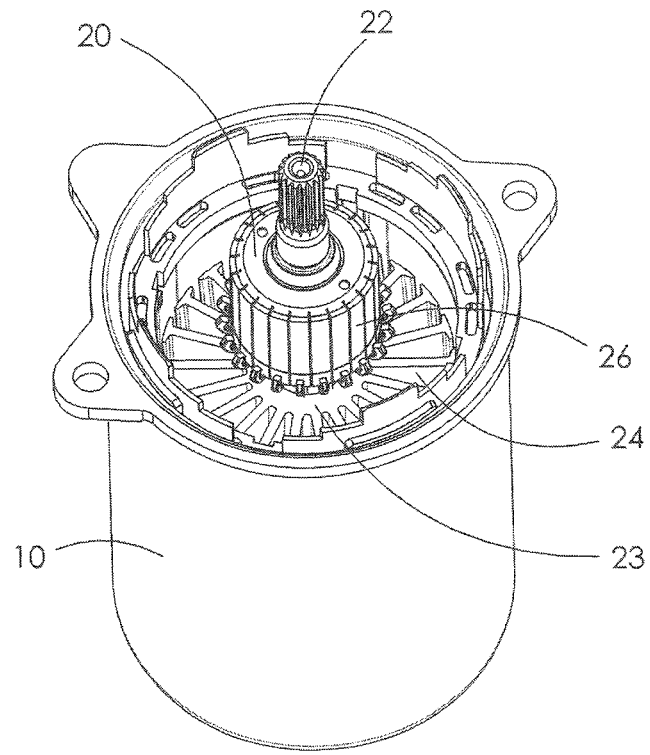
FIG. 3 illustrates a rotor assembled to the stator of FIG. 2.

FIG. 3 illustrates the rotor assembled with the stator. The rotor 20 comprises a shaft 22. A rotor core 23, having a plurality of teeth 24, is fixed to the shaft. A commutator 26 is fixed to the shaft next to the rotor core. The shaft is journalled in bearings supported by the closed end of the housing and the end cap. A rotor winding (not shown) is wound about the teeth of the rotor core in a generally known manner. The winding includes a number of coils, the ends of which are connected to segments of the commutator 26.

Figure 4:
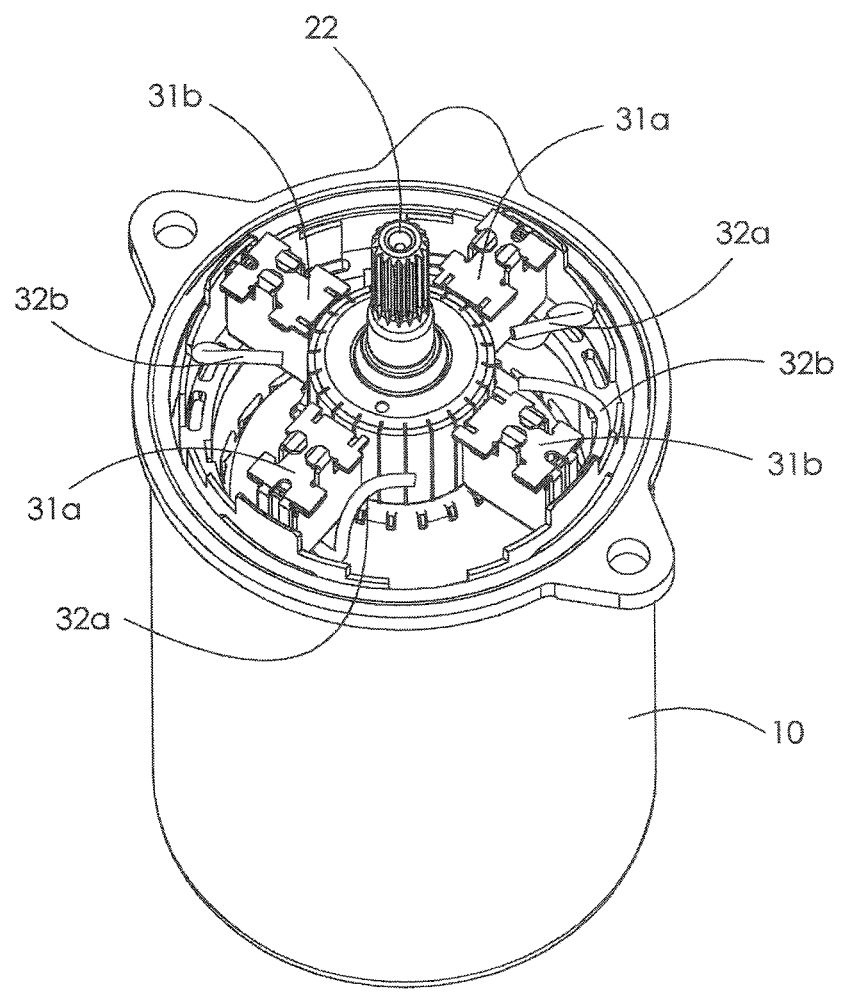
FIG. 4 illustrates brush assemblies added to the rotor and stator assembly of FIG. 3.

FIG. 4 illustrates brush assemblies 31 added to the rotor and stator assembly of FIG. 3. There are two brush assemblies 31a and two brush assemblies 31b, alternately and evenly arranged about the periphery of the commutator 26 and arranged such that the brushes make sliding contact with the commutator 26. A brush mounting plate (see FIG. 6, 35) for positioning the brush assemblies is not shown in FIG. 4. Shunts 32a, 32b extend out from each of the brushes respectively. During operation, as the rotor 20 rotates, the brushes of the assemblies 31a and 31b sequentially contact segments of the commutator 26.

Figure 5:
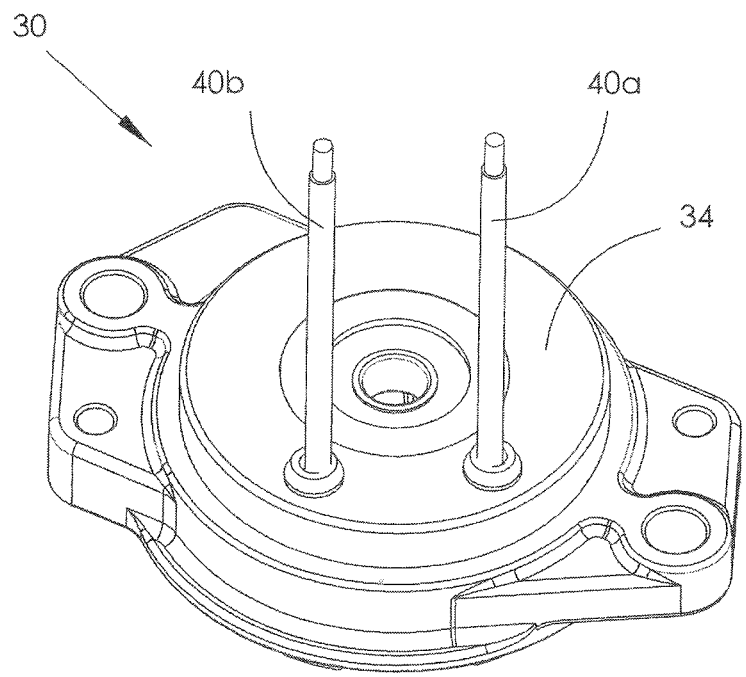
FIG. 5 illustrates an end cap, being a part of the motor of FIG. 1.
Figure 6:
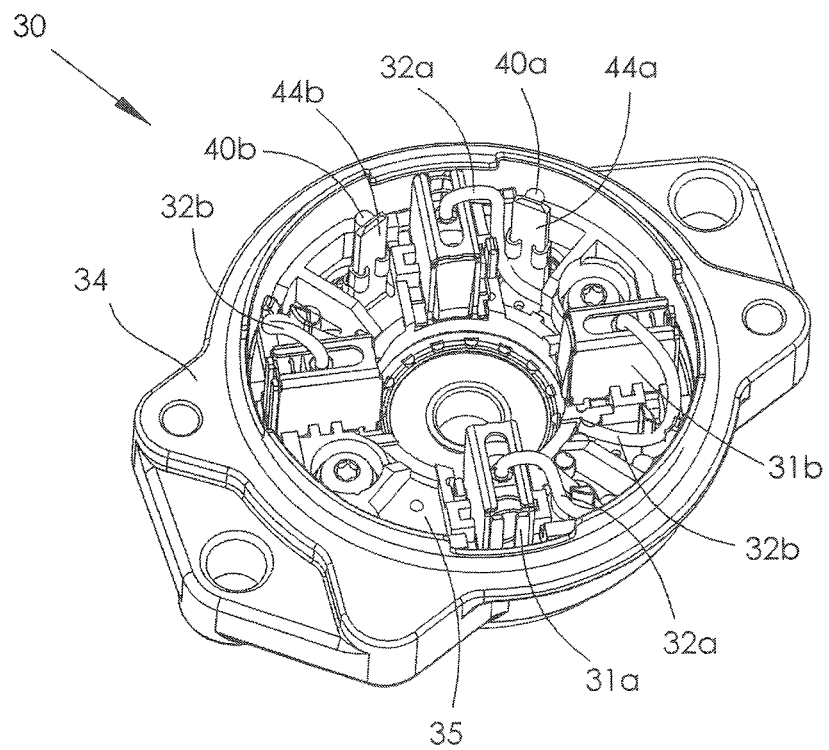
FIG. 6 shows the end cap of FIG. 5, viewed from the other side.

FIGS. 5 and 6 illustrate the end cap 30 from outside and inside. The end cap 30 includes a cover 34. An annular brush mounting plate 35 is disposed at an inner side of the cover 30. The brush assemblies 31a and 31b are fixedly mounted to the brush mounting plate 35. Shunts 32a and 32b are connected with connection plates 33a and 33b, respectively.

Figure 7:
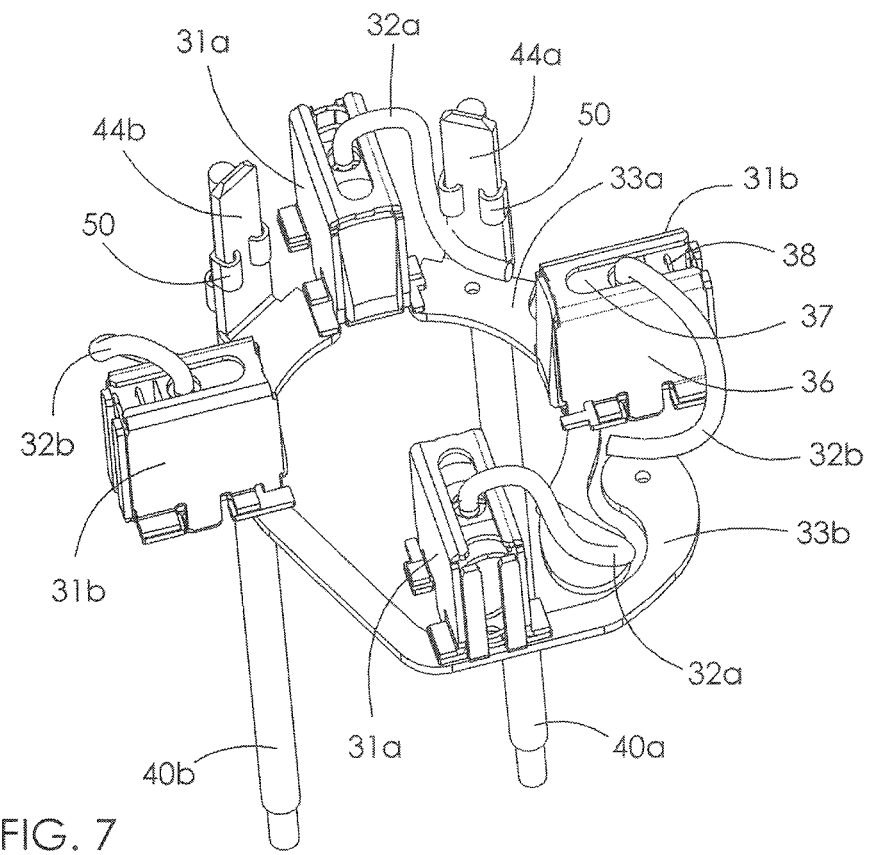
FIG. 7 illustrates brush gear of the motor, comprising the brush assemblies, power leads and connection plates.
Figure 8:
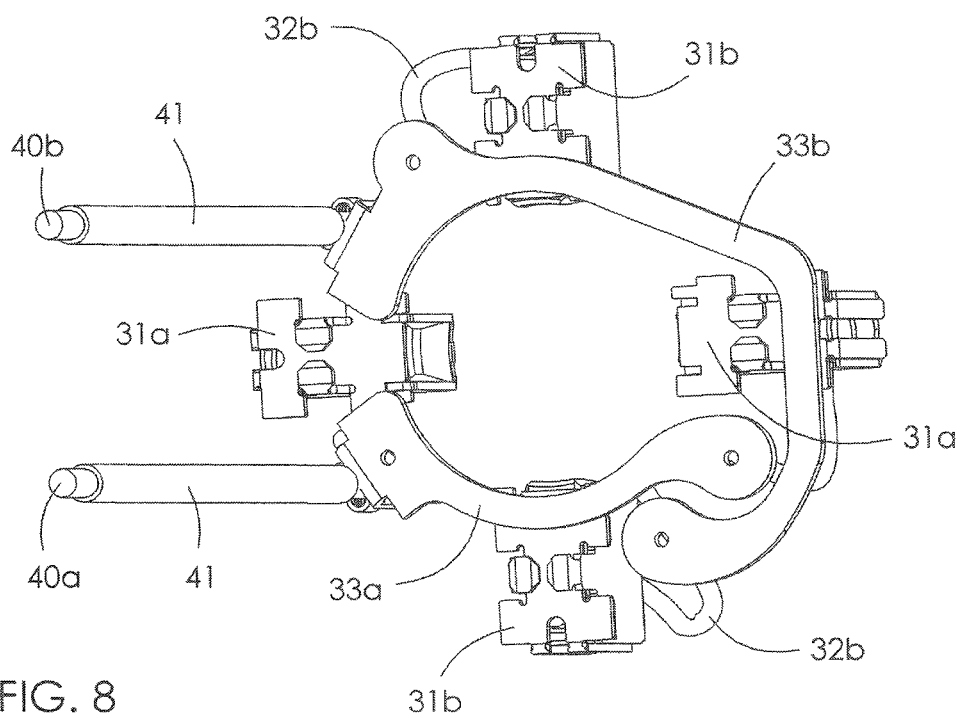
FIG. 8 shows the brush gear of FIG. 7, viewed from the other side.

FIG. 7 and FIG. 8 illustrate, from above and below, the brush gear comprising the four brush assemblies, the two connection plates and the two power leads. Each brush assembly comprises a brush cage, a brush slidably received in the brush cage and a brush spring arranged to urge the brush out of the brush cage. For clearer illustration, the brush mounting plate 35 is not shown. The two brush assemblies 31a and two brush assemblies 31b are alternately arranged. Two shunts 32a extend from the two brush assemblies 31a, respectively. Two shunts 32b extend from the two brush assemblies 31b, respectively. The free ends of the shunts are connected to the connection plates, preferably by welding. Shunts 32a are connected to connection plate 33a and shunts 32b are connected to connection plate 33b. Power lead 40a is connected to the connection plate 33a and power lead 40b is connected to connection plate 33b, in a manner described herein after. As such the two shunts 32a are electrically connected with power lead 40a, and the two shunts 32b are electrically connected to power lead 40b. As such, the two brush assemblies 31a are commonly connected to the power lead 40a, and the two brush assemblies 31b are commonly connected to the power lead 40b.

Connection plate 33a includes an extension which is bent 90 degrees to form a terminal plate 44a. The connection plate 33b likewise includes an extension which is bent 90 degrees to form terminal plate 44b. The terminal plates 44a, 44b are generally rectangular, forming male spade terminals. The power leads 40a, 40b are respectively connected to the terminal plates through wire connectors 50. A middle part of each of the power leads 40a and 40b between opposite ends thereof is wrapped with an insulating layer 41 to ensure that the power leads are safely connected to the power source without being electrically connected to another component.

Figure 9:
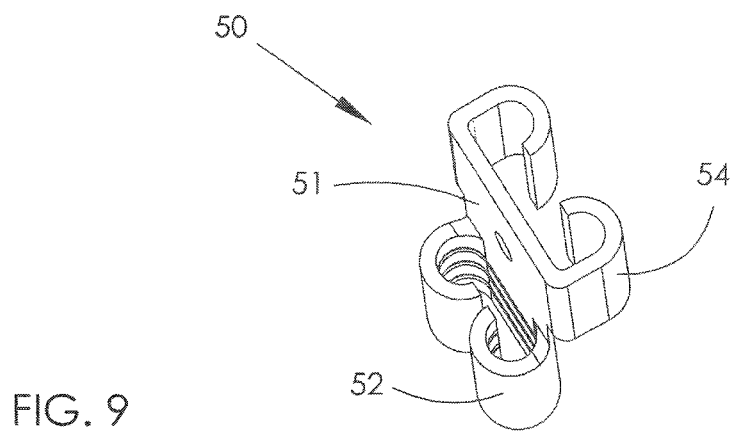
FIG. 9 illustrates a wire connector.

FIG. 9 illustrates a wire connector 50. Preferably, the wire connector 50 is formed from copper and has a base plate 51 with top and bottom ends. A first bent portion 52 is disposed at the bottom end of the base plate 51, and a second bent portion 54 is disposed at the top end of the base plate 51. The second bent portion 54 has two generally U-shaped sides. The distance between the two U-shaped sides is slightly greater than the width of the terminal plate 44a, 44b, to receive the terminal plate there between. The free ends of the sides curl back towards the base plate and are spaced therefrom by a distance less than the thickness of the terminal plate such that the sides are resiliently deformed when the terminal plate is pressed into the wire connector to tightly grip the terminal plate. The first bent portion 52 is arranged to be crimped to the power lead to mechanically fix the power lead to the wire connector and thus to the terminal plate. The wire connector 50 is arranged to be crimped to the power lead such that the free end of the power lead extends passed the wire connector.

Figure 10:
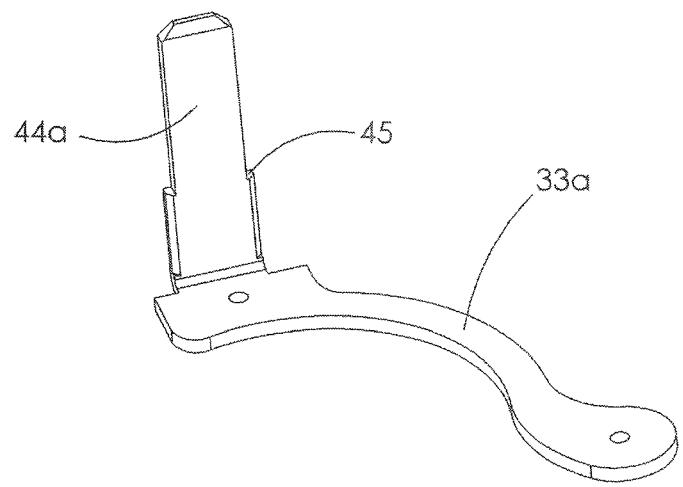
FIG. 10 illustrates one of the connection plates of FIG. 7.

FIG. 10 illustrates connection plate 33a, to more clearing show the structure of terminal plate 44a. Terminal plate 44a has a generally rectangular shape. A detent 45 is formed at a middle area of a side of the pin plate 44a for limiting downward movement of the wire connector 50 relative to the terminal plate 44a. The detent is in the form of a step in the side of the terminal plate which forms a stop which bears against the axial edge of the second bent portion 54. The detent 45 may be formed at another location, as long as it limits the downward movement of the wire connector 50 with respect to the terminal plate 44a. In this embodiment, the terminal plate 44a is integrally formed with the conductive plate 33a by stamping and is bent 90 degrees to form the pin plate 44a perpendicular to the conductive plate 33a. In another embodiment, the connection plate and terminal plate may extend in the same direction or at an angle other than 90 degrees.

Figure 11:
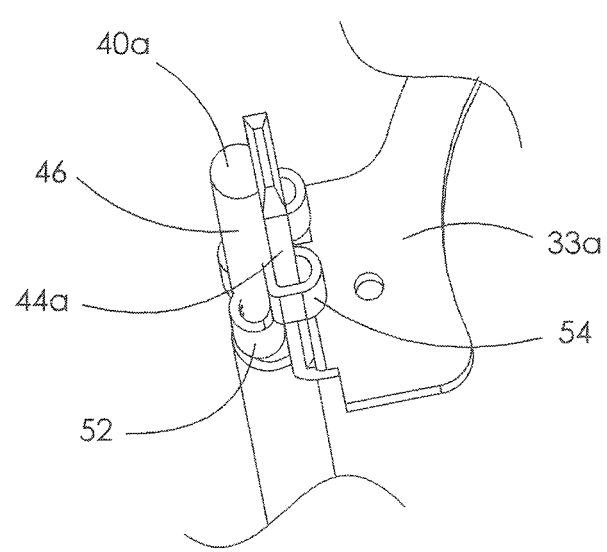
FIG. 11 illustrates the connection between a power lead and a connection plate.

FIG. 11 illustrates the connection between the power lead 40a and the connection plate 33a. Power lead 40b and connection plate 33b are similarly connected. The end of the power lead 40a is stripped of insulation. The bared end is crimped to the wire connector 50a and the wire connector is fitted to the terminal plate 44a to establish a mechanical connection between the power lead and the connection plate. The wire connector 50a is crimped to the power lead 40a in such a manner that the bared end 46 of the power lead extends beyond the wire connector. The terminal plate 44a is inserted into the second bent end 54, resiliently deforming the ends of the c-shaped sides which then press the terminal plate 44a to the base plate 51 of the wire connector. The terminal plate is inserted through the wire connector until detents 45 contact the c-shaped sides 54 of the wire connector, thus establishing the correct position of the wire connector with respect to the terminal plate. At this position the free end 46 of the power lead extending beyond the wire connector lays against the distal end of the terminal plate 44a. With the power lead physically connected to the terminal plate in a stable manner, the end of the power lead 40a is electrically connected to the terminal plate 44a by a separate electrical connection. This electrical connection is preferably a weld connection, such as made for example using a spot welding technique. Other types of electrical connections, such as those made by soldering, fusing or crimping, may be used depending on the application and manufacturing process needs. Indeed, other types of mechanical fixation methods may be used to physically fix the power lead to the terminal plate.

Hence, the power leads are connected to the motor terminals through a mechanical connection and a separate electrical connection. Thus the electrical connection is isolated from strain and vibrations applied to the power leads ensuring a good and stable electrically connection over the life of the motor.

In the description and claims of the present application, each of the verbs "comprise", "include", "contain" and "have", and variations thereof, are used in an inclusive sense, to specify the presence of the stated item but not to exclude the presence of additional items.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Although the invention is described with reference to a preferred embodiment, it should be appreciated by those skilled in the art that various modifications are possible. For example, the mechanical connection may not be a wire connector or the wire connector may be directly welded to the terminal plate. Also the terminal plate may have a shape different to a male spade connector. Therefore, the scope of the invention is to be determined by reference to the claims that follow.

The invention claimed is:

1. An electric motor comprising: a stator, a rotor rotatable with respect to the stator, motor windings, a connection plate electrically connected to the motor windings, a power lead for connecting the motor to a power source, and a wire connector connected to both of the connection plate and the power lead,
wherein the power lead is directly welded to the connection plate, the wire connector is connected to both of the connection plate and the power lead with unwelded detachable mechanical connections.

2. The motor of claim 1, wherein the rotor is a wound rotor having a rotor core and a commutator mounted on a shaft, and the motor windings are formed by coils wound about teeth of the rotor core and connected to segments of the commutator, and wherein the connection plate is electrically connected to the windings by brushes making sliding contact with the commutator.

3. The motor of claim 2, wherein the stator has a housing and permanent magnets fixed to the housing.

4. The motor of claim 3, further comprising an end cap fitted to the housing and supporting brush gear, including a plurality of said brushes, the connection plate and a brush mounting plate to which the brushes and the connection plate are mounted.

5. The motor of claim 4, wherein each brush is part of a separate brush assembly comprising the brush, a brush cage in which the brush is slidably mounted and a brush spring for urging the brush into contact with the commutator.

6. The motor of claim 5, wherein each brush has a shunt and at least one of the shunts is electrically connected to the connection plate.

7. The motor of claim 6, wherein there are two connection plates, two power leads respectively connected to the connection plates and two groups of brush assemblies with the brushes of each group of brush assemblies being connected to a corresponding connection plate.

8. The motor of claim 7, wherein there are two brush assemblies in each group of brush assemblies and the brushes of each group are arranged alternately about the commutator.

9. The motor of claim 1, wherein the connection plate has a terminal plate in the form of a male spade terminal, the wire connector comprises a female spade terminal, the terminal plate of the connection plate is mated in the female spade terminal of the wire connector.

10. The motor of claim 9, wherein the wire connector comprise a base plate and a bent portion, the bend portion comprises two generally U-shaped sides extending form the base plate and opposite to each other to resiliently hold the terminal plate of the connection plate.

11. The motor of claim 10, wherein a free end of each of the sides of the bent portion curls back towards the base plate to tightly grip the terminal plate between the free ends of the sides of the bent portion and the base plate with the bent portion be resiliently deformed.

12. The motor of claim 1, wherein the power lead and the connection plate are attached to opposite sides of the wire connector, with a free end of the power lead extending beyond the wire connector and welded to the connection plate.

* * * * *